(No Model.)

G. EDMONDSON.
STEAM HEATED BOILER.

No. 264,266. Patented Sept. 12, 1882.

Attest:
J. C. Turner.
R. W. Smith.

Inventor:
George Edmondson
By his Atty R. W. Smith

UNITED STATES PATENT OFFICE.

GEORGE EDMONDSON, OF NEW HAVEN, CONNECTICUT.

STEAM-HEATED BOILER.

SPECIFICATION forming part of Letters Patent No. 264,266, dated September 12, 1882.

Application filed July 17, 1882. (No model.)

*To all whom it may concern:*

Be it known that I, GEORGE EDMONDSON, of New Haven, in the county of New Haven and State of Connecticut, have invented a new and useful Improvement in Steam-Heated Boilers, especially adapted to glue-pots for the use of book-binders and others who employ glue in large quantities and require to keep the same in constant readiness for use, of which the following is a specification.

I am aware that a boiler has been made with a steam-chamber underneath its entire bottom. I am also aware that such a steam-chamber has been made integral with the walls of the boiler. I am furthermore aware that a steam-pipe, coiled or otherwise, has been introduced into a boiler to heat the water therein. I therefore do not propose to claim the employment of a steam chamber or pipe for the purpose of heating water in a vessel, but only the special construction shown and described hereinafter, whereby an advantage is gained valuable for the purposes named.

My improvement therefore consists in a water-pot of cast-iron provided with a single steam duct or pipe, cast integral with said pot, extending centrally across the bottom and extending vertically upward therefrom.

Having now set forth in general terms the nature of my invention, I will more particularly describe it, having reference to the accompanying drawings, wherein—

Figure 1:
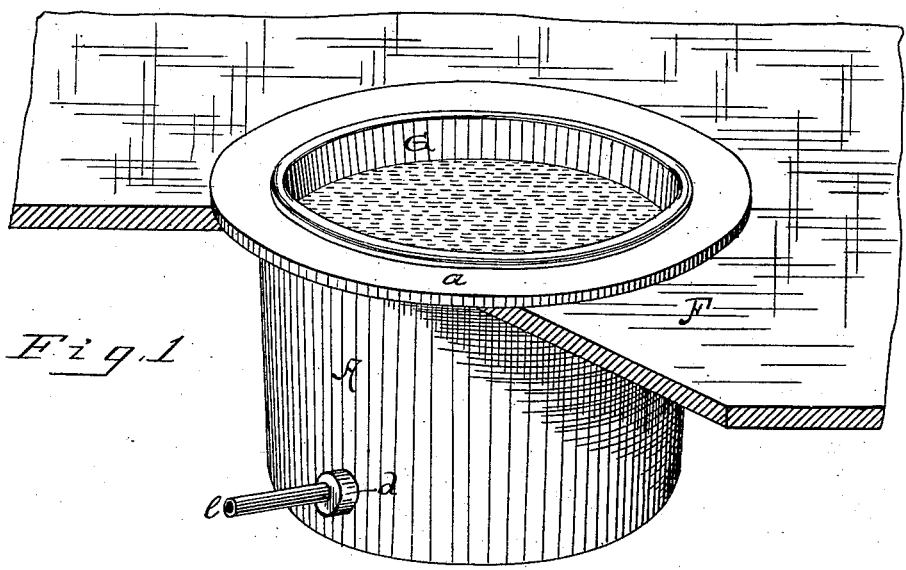
Figure 2:
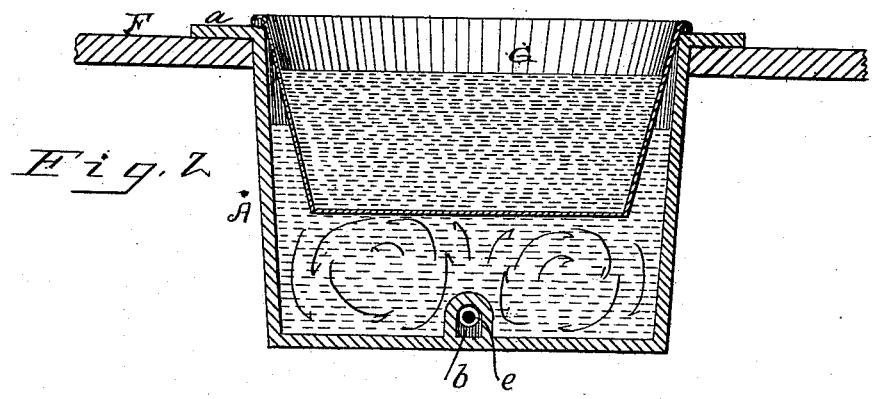
Figure 3:
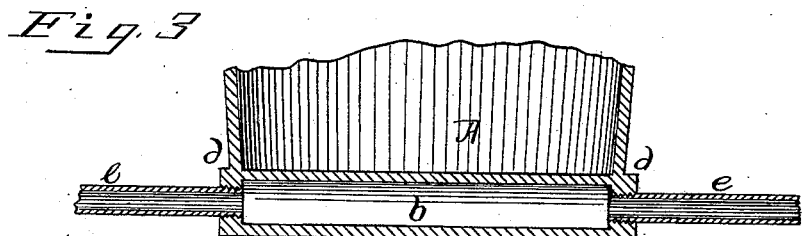

Figure 1 is a perspective view of my device in operative position. Fig. 2 is a transverse central sectional elevation of the same. Fig. 3 is a transverse vertical section at right angles with Fig. 2.

A is a water pot or boiler, of cast-iron, provided with a rim-flange, $a$, and the steam pipe or chamber $b$, cast integral across the bottom of said pot and extending upward therefrom, so as to present more or less nearly vertical sides to the water within said pot. Upon the outside of said pot, at each end of said steam-space $b$, there is a hub, $d$, which is bored and tapped, so that the steam-pipe $e$ may be screwed in and direct connection be thereby made with the chamber $b$. It is preferred to make the chamber $b$ integral with the pot A, because it has been found that differences in expansion and contraction render it practically very difficult to make connection through the wall of the pot with an internal separate chamber and maintain the same tight against leakage; but no difficulty of this sort is encountered when the chamber $b$ is made integral with the pot. The pot A hangs by its flange $a$ in a hole in the bench F, and the hubs $d$ do not have sufficient projection to render it necessary to enlarge the holes in the bench on that account; but as it is always necessary to place a separate steam-chamber in the pot before setting in the bench, and make a joint with outside couplings, it has always been found necessary to employ couplings which project so far as to render an enlargement of the bench-hole necessary in order to put the pot in place. It is of course desirable to avoid this enlargement. The chamber $b$, made integral with the pot, is also cheaper, because it avoids the expense of forming and maintaining tight joints between itself and the pot. The vertical projection of the chamber $b$ is an important improvement. Its hot upward-projecting sides set up an immediate circulation of the surrounding water more effectively than can possibly be the case where the heated surface is horizontal or substantially so, because the circulation over a uniformly-heated horizontal bottom must be extremely complicated, and in a corresponding degree ineffective, whereas the circulation instituted by a hot upright surface will be immediate and regular. In this case it will assume movements as indicated by the circling arrows. The effect of this regular circulation is increased percentage of work done by the steam or a decreased consumption of steam for a stated amount of work.

G is the glue-pot or other vessel containing the substance to be heated by the water within the boiler A.

Having described my invention, what I claim as new is—

1. A boiler or glue-pot heater, consisting of a cast-iron pot, A, provided with a centrally-transverse chamber, $b$, extending across and vertically upward from the bottom of said pot, and a steam-connection with said chamber at each end.

2. A boiler or glue-pot heater, A, provided with the central transverse chamber, b, made integral with the bottom of said pot and projecting upward from the same, as set forth.

3. A boiler or glue-pot heater, A, of cast-iron, provided with the flange a, hubs d d, and transverse central chamber, b, cast integral with and projecting upward from the bottom of said pot, as set forth.

GEORGE EDMONDSON.

Witnesses:
B. F. RYDER,
LOUIS A. BABCOCK.